United States Patent
Wen et al.

(10) Patent No.: US 8,965,200 B2
(45) Date of Patent: Feb. 24, 2015

(54) METHOD, APPARATUS AND SYSTEM FOR DETECTING CONNECTION STATUS OF OPTICAL FIBER JUMPER

(75) Inventors: Yunsheng Wen, Shenzhen (CN); Jun Zhao, Shenzhen (CN); Bo Wang, Shenzhen (CN); Xiaolei Shan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 677 days.

(21) Appl. No.: 13/301,469

(22) Filed: Nov. 21, 2011

(65) Prior Publication Data

US 2012/0063767 A1    Mar. 15, 2012

Related U.S. Application Data

(63) Continuation of application No. PCT/CN2010/076343, filed on Aug. 25, 2010.

(30) Foreign Application Priority Data

Aug. 25, 2009 (CN) .......................... 2009 1 0091786

(51) Int. Cl.
*H04B 10/08* (2006.01)
*G02B 6/38* (2006.01)

(52) U.S. Cl.
CPC .................................. *G02B 6/3895* (2013.01)
USPC .................... 398/16; 398/20; 398/22; 398/23; 398/24; 398/9; 398/33; 398/202; 398/139; 398/135; 356/73.1

(58) Field of Classification Search
CPC ............... H04B 10/075; H04B 10/079; H04B 10/0795; H04B 10/07957; H04B 10/40; H04B 10/50; H04B 10/60
USPC ........... 398/16, 20, 135, 25, 33, 34, 38, 9, 10, 398/13, 17, 22, 23, 24, 202, 208, 164, 139, 398/30, 32, 141; 356/73.1
See application file for complete search history.

(56) References Cited

U.S. PATENT DOCUMENTS

| 5,353,367 A | 10/1994 | Czosnowski et al. |
| 6,554,485 B1 | 4/2003 | Beatty et al. |

(Continued)

FOREIGN PATENT DOCUMENTS

| CN | 200959639 Y | 10/2007 |
| CN | 200997008 Y | 12/2007 |

(Continued)

OTHER PUBLICATIONS

Chinese Patent No. 101995612, issued on Dec. 12, 2012, granted in corresponding Chinese Patent Application No. 200910091786.1.

(Continued)

*Primary Examiner* — Hanh Phan
(74) *Attorney, Agent, or Firm* — Brinks Gilson & Lione

(57) ABSTRACT

A method, an apparatus and a system for detecting a connection status of an optical fiber jumper are provided in the embodiments of the present invention. The method for detecting a connection status of an optical fiber jumper includes: judging a connection status of a second port and a first port according to whether an optical signal sent by the first port to the second port through a first optical fiber is received, wherein the first optical fiber is connected to two ends of an optical fiber jumper, and the two ends of the optical fiber jumper are connected to the first port and the second port respectively; and obtaining a port identification corresponding to the first port according to the optical signal if the optical signal is received.

15 Claims, 6 Drawing Sheets

(56) References Cited

U.S. PATENT DOCUMENTS

| | | | |
|---|---|---|---|
| 6,574,586 B1 | 6/2003 | David et al. | |
| 7,120,347 B2 | 10/2006 | Blackwell, Jr. et al. | |
| 8,184,970 B2 * | 5/2012 | Hosking | 398/9 |
| 8,687,966 B2 * | 4/2014 | Hosking | 398/135 |
| 2004/0240807 A1 | 12/2004 | Frohlich et al. | |
| 2008/0218355 A1 | 9/2008 | Downie et al. | |

FOREIGN PATENT DOCUMENTS

| | | |
|---|---|---|
| CN | 201035186 Y | 3/2008 |
| CN | 201039187 Y | 3/2008 |
| CN | 201047880 Y | 4/2008 |
| DE | 10041438 A1 | 3/2002 |
| WO | WO 2006010326 A1 | 2/2006 |

OTHER PUBLICATIONS

Written Opinion of the International Searching Authority issued in corresponding PCT Patent Application No. PCT/CN2010/076343, mailed Dec. 16, 2010.

Extended European Search Report issued in corresponding European Patent Application No. 10811268.1, mailed Aug. 1, 2012.

International Search Report issued in corresponding PCT Patent Application No. PCT/CN2010/076343, mailed Dec. 16, 2010.

* cited by examiner

METHOD, APPARATUS AND SYSTEM FOR DETECTING CONNECTION STATUS OF OPTICAL FIBER JUMPER

CROSS-REFERENCE TO RELATED APPLICATIONS

This application is a continuation of International Application No. PCT/CN2010/076343, filed on Aug. 25, 2010, which claims priority to Chinese Patent Application No. 200910091786.1, filed on Aug. 25, 2009, both of which are hereby incorporated by reference in their entireties.

FIELD OF THE APPLICATION

The embodiments of the present application relate to communications technologies, and in particular, to a method, an apparatus and a system for detecting a connection status of an optical fiber jumper.

BACKGROUND OF THE APPLICATION

A fiber to the x (FTTX) technology is mainly used for network optical fiber popularization, which ranges from central office equipment of a local telecommunication machine room to user terminal equipment. Currently, an Optical Distribution Frame (Optical Distribution Frame, hereinafter referred to as ODF) of a machine room of an FTTX operator is used for distributing backbone optical cables of a central office in an optical fiber communication system. Connection, distribution and scheduling of optical fiber lines may be conveniently implemented through the ODF. Currently, operation and maintenance of the ODF are mainly accomplished manually. However, because the number of optical fiber jumpers on an ODF is enormous, an error may be introduced into an operation on an optical fiber jumper due to untimely update of a data record made after the optical fiber jumper are operated, an unauthorized operation on the optical fiber jumper, or a wrong connection and plugging caused by other human errors. However, these wrong operations on the optical fiber jumper may further result in problems that two ports to be connected cannot be quickly found, a connection status of the optical fiber jumper cannot be known in real time, a port connection record of a database cannot be automatically updated in real time, accurate alarm information cannot be obtained in real time, and a fault cannot be eliminated.

For a method for detecting an optical fiber jumper in the prior art, two electric connection ports are added onto any two connected ports respectively, pins corresponding to the electric connection of the two ports are added onto plugs at two ends of the optical fiber jumper respectively, and the pins between the two ports are electrically connected. A detecting apparatus detects whether a loop formed by the two ports and the optical fiber jumper is closed, and may further judge whether the two ports are connected.

During the implementation of the present invention, the inventor finds that the prior art has at least the following problems: Plugs at two ends of each optical fiber jumper are electrically connected to two ports, and the two ports are electrically connected. Therefore, when a plurality of optical fiber jumpers exists on an ODF, through electromagnetic field coupling, the plurality of optical fiber jumpers may interfere with signal detection between other optical fiber jumpers; a sparking phenomenon easily occurs to an electric connection between a plug and a port, so that a detection procedure is unsafe. Furthermore, an optical fiber jumper is plugged for a plurality of times, so that wear and tear is easily generated, thus influencing the reliability of electric contact.

SUMMARY OF THE APPLICATION

Embodiments of the present application provide a method, an apparatus and a system for detecting a connection status of an optical fiber jumper, so as to solve problems in the prior art that a detection procedure is unsafe and an interference signal is easily generated.

In an aspect, an embodiment of the present application provides a method for generating a signal indicating a connection status of an optical fiber jumper, which includes:

generating an optical signal corresponding to a first port; and sending the optical signal to a second port through a first optical fiber, where the first optical fiber is connected to two ends of an optical fiber jumper, and the two ends of the optical fiber jumper are connected to the first port and the second port respectively.

An embodiment of the present application further provides a method for detecting a connection status of an optical fiber jumper, which includes:

judging a connection status between a second port and a first port according to whether an optical signal sent by the first port to the second port through a first optical fiber is received, where two ends of the optical fiber jumper are connected to the first port and the second port respectively; and obtaining a port identification corresponding to the first port according to the optical signal if the optical signal is received.

In another aspect, an embodiment of the present application provides an apparatus for generating a signal indicating a connection status of an optical fiber jumper, which includes:

a generating module, configured to generate an optical signal corresponding to a first port; and a sending module, configured to send the optical signal to a second port through a first optical fiber, where the first optical fiber is connected to two ends of an optical fiber jumper, and the two ends of the optical fiber jumper are connected to the first port and the second port respectively.

An embodiment of the present application further provides an apparatus for detecting a connection status of an optical fiber jumper, which includes:

a judging module, configured to judge whether an optical signal sent by a first port to a second port through a first optical fiber is received, where the first optical fiber is connected to two ends of an optical fiber jumper, and the two ends of the optical fiber jumper are connected to the first port and the second port respectively;

a first obtaining module, configured to obtain a connection status between the second port and the first port according to a judgment result of the judging module; and a second obtaining module, configured to obtain a port identification corresponding to the first port according to the optical signal if the judging module judges that the optical signal is received.

An embodiment of the present application further provides a system for detecting a connection status of an optical fiber jumper, which includes:

a signal generation apparatus, configured to generate an optical signal corresponding to a first port, and send the optical signal to a second port through a first optical fiber, where the first optical fiber is connected to two ends of an optical fiber jumper, and the two ends of the optical fiber jumper are connected to the first port and the second port respectively; and a detecting apparatus, configured to judge a connection status between the second port and the first port according to whether the optical signal sent by the first port to the second port through the first optical fiber is received, and obtain a port identification corresponding to the first port according to the optical signal if the optical signal is received.

With the method, the apparatus and the system for detecting a connection status of an optical fiber jumper provided in the embodiments of the present application, an optical fiber is disposed in parallel on an optical fiber jumper that is connected to any two ports, so that the optical fiber is connected to two ends of the optical fiber jumper respectively, an optical signal is generated at one of the ports and sent to the other port through the optical fiber, and an identification of the port sending the optical signal and a connection status of the two ports are detected through a case that the optical signal is received at the other port. Optical paths of different optical fiber jumpers are independent of each other, an interference signal between the optical paths does not occur in a detection procedure, and therefore, the detection procedure is made safer. Meanwhile, a connection status o f each port can be updated in real time, and corresponding processing is conveniently performed for a wrong operation of the port.

DETAILED DESCRIPTION OF THE EMBODIMENTS

The technical solutions of the embodiments are described in detail in the following through the accompanying drawings and the embodiments.

Figure 1A:
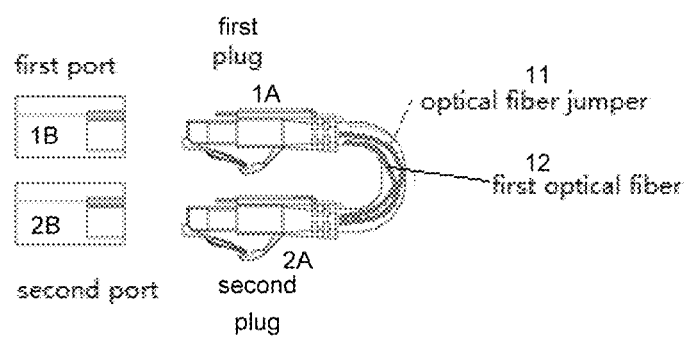
FIG. 1A is a diagram illustrating an exemplary method of connecting a first port and a second ported using an optical fiber jumper.
Figure 1B:
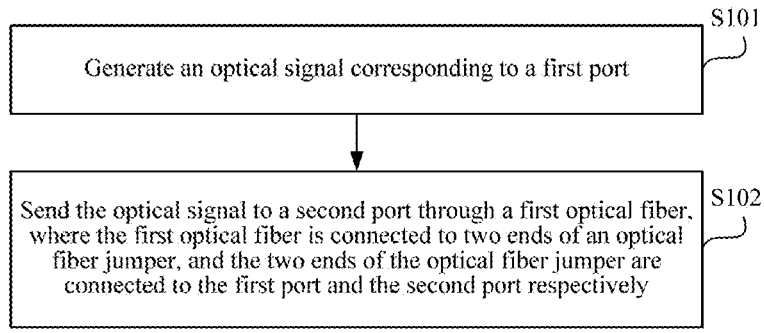
FIG. 1B is a flowchart of a method for generating a signal indicating a connection status of an optical fiber jumper according to an embodiment of the present application.

FIG. 1B is a flowchart of a method for generating a signal indicating a connection status of an optical fiber jumper according to an embodiment of the present application. As shown in FIG. 1B, the method includes:

S101: Generate an optical signal corresponding to a first port.

S102: Send the optical signal to a second port through a first optical fiber, where the first optical fiber is connected to two ends of an optical fiber jumper, and the two ends of the optical fiber jumper are connected to the first port and the second port respectively.

The method described in the above flow chart of FIG. 1B may be illustrated by FIG. 1A. Specifically, Figure 1A shows an optical fiber jumper 11, having both ends terminated by a first plug 1A and a second plug 2A, respectively. The first plug 1A and the second plug 2A may be coupled to or inserted to a first port 1B and a second port 2B, respectively. The first port 1B and the second port 2B may be any two ports connected onto an Optical Distribution Frame ODF of a machine room of an FTTX operator, and, As shown in FIG. 1A, the first port 1A and the second port 2A are connected through the optical fiber jumper 11 by coupling to the first and the second plugs (1B, 2B) at the both ends of the optical fiber jumper 11, respectively Therefore, detecting a connection condition between the first port 1A and the second port 2A is to detect connection conditions between one of the plugs at the two ends of the optical fiber jumper 11 and the first port 1A, and between the other plug at the two ends of the optical fiber jumper 11 and the second port 2A. A first optical fiber 12 for transferring a detecting signal may be added or placed in parallel onto the optical fiber jumper 11, wherein the first optical fiber 12 may be a Plastic Optical Fiber (Plastic Optical Fiber, hereinafter referred to as POF). The first optical fiber 12 may also be of other types of optical fibers having an aperture with a large numerical value so as to facilitate optical coupling, such as an optical crystal or a polymer, and may further be a special optical fiber such as a Polyvinylchloride (Polyvinylchloride, hereinafter referred to as PVC) optical fiber. The length of the first optical fiber 12 may be set according to the length of the optical fiber jumper 11, and is placed in parallel with the optical fiber jumper 11. As shown in FIG. 1A, the two ends of the first optical fiber are also fixed onto the same first and second plugs (1A, 2A) at the two ends of the optical fiber jumper 11, respectively. In this way, if the optical signal sent from the first port 1B through the first optical fiber 12 may be successfully received by the second port 2B, it may be regarded that the first port 1B and the second port 2B are in a connection status. If the second port 2B does not receive the optical signal sent from the first port 1B through the first optical fiber 12, it may indicate that the first port 1B and the second port 2B may be in a disconnected status. Because the first optical fiber 12 is selected as a path for transferring the detecting signal, wherein the detecting signal is the optical signal. The optical signal corresponding to the first port may be generated according to a rule, and the signal is used to distinguish the first port 1B from other ports; if the second port 2B receives the optical signal, according to the rule for generating the optical signal, which port is currently connected to the second port 2B may be detected.

With the method for detecting a connection status of an optical fiber jumper provided in this embodiment of the present application, an optical fiber is disposed in parallel on an optical fiber jumper that is connected to any two ports, so that the optical fiber is connected to two ends of the optical fiber jumper respectively, an optical signal is generated at one of the ports and sent to the other port through the optical fiber, and a connection status of the two ports may be detected through a case that the optical signal is received at the other port. Optical paths of different optical fiber jumpers are independent of each other, an interference signal between the optical paths does not occur in a detection procedure, and therefore, the detection procedure is made safer.

Figure 2:
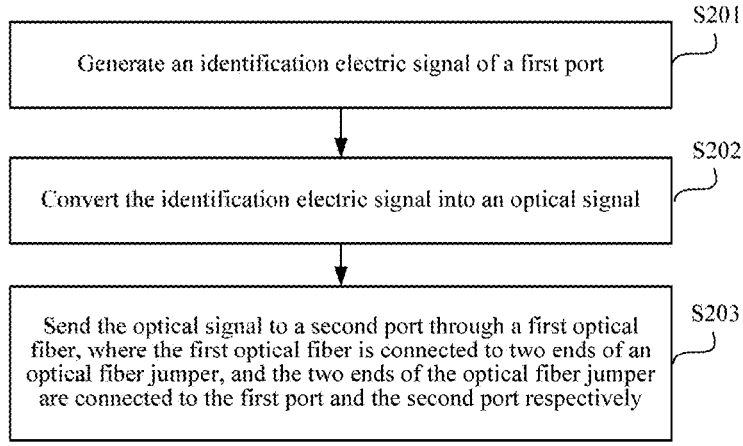
FIG. 2 is a flowchart of a method for generating a signal indicating a connection status of an optical fiber jumper according to another embodiment of the present application.

FIG. 2 is a flowchart of a method for generating a signal indicating a connection status of an optical fiber jumper according to another embodiment of the present application. As shown in FIG. 2, the method includes:

S201: Generate an identification electric signal of a first port.

S202: Convert the identification electric signal into an optical signal.

S203: Send the optical signal to a second port through a first optical fiber, where the first optical fiber is connected to two ends of an optical fiber jumper, and the two ends of the optical fiber jumper are connected to the first port and the second port respectively.

On the basis of the previous embodiment, because the electric signal is generated more easily, an identification (identification, hereinafter referred to as ID) electric signal used for distinguishing each port from other ports may be generated for each port through a logic element, and then the ID electric signal is converted into an optical signal through some photoelectric converting elements, such as a Light Emitting Diode (Light Emitting Diode, hereinafter referred to as LED). If the optical signal sent from the first port to the second port through the first optical fiber may be received by the second port, it may be regarded that the first port and the second port are in a connection status, and furthermore, according to a rule for generating the optical signal, which port is currently connected to the second port may be detected. If the second port does not receive the optical signal sent from the first port to the second port through the first optical fiber, it indicates that the first port and the second port are in a disconnected status.

With the method for detecting a connection status of an optical fiber jumper provided in this embodiment of the present application, an optical fiber is disposed in parallel on an optical fiber jumper that is connected to any two ports, so that the optical fiber is connected to two ends of the optical fiber jumper respectively, an optical signal is generated at one of the ports and sent to the other port through the optical fiber, and a connection status of the two ports may be detected through a case that the optical signal is received at the other port. Optical paths of different optical fiber jumpers are independent of each other, an interference signal between the optical paths does not occur in a detection procedure, and therefore, the detection procedure is made safer.

Figure 3:
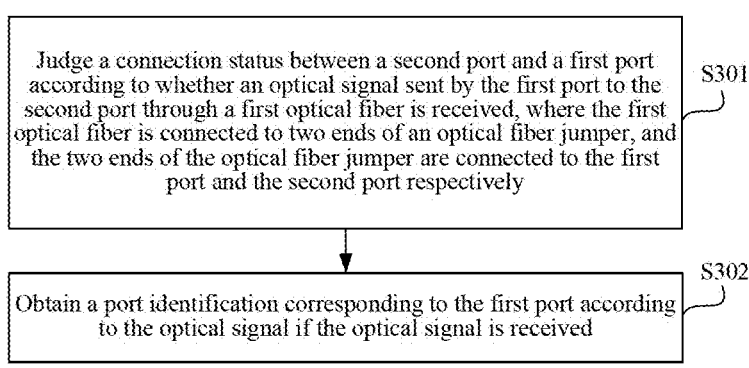
FIG. 3 is a flowchart of a method for detecting a connection status of an optical fiber jumper according to an embodiment of the present application.

FIG. 3 is a flowchart of a method for detecting a connection status of an optical fiber jumper according to an embodiment of the present application. As shown in FIG. 3, the method includes:

S301: Judge a connection status between a second port and a first port according to whether an optical signal sent by the first port to the second port through a first optical fiber is received, where the first optical fiber is connected to two ends of an optical fiber jumper, and the two ends of the optical fiber jumper are connected to the first port and the second port respectively.

S302: Obtain a port identification corresponding to the first port according to the optical signal if the optical signal is received.

Specifically, the first port and the second port are any two ports connected onto an ODF of a machine room of an FTTX operator, the first port and the second port are connected through the optical fiber jumper having plugs at two ends thereof respectively; in order to test connection conditions between one of the plugs at the two ends of the optical fiber jumper and the first port, and between the other plug at the two ends of the optical fiber jumper and the second port, a first optical fiber for transferring a detecting signal may be added onto the optical fiber jumper, and the first optical fiber may be a POF, and definitely may also be other types of optical fibers having an aperture with a large numerical value. The length of the first optical fiber may be set according to the length of the optical fiber jumper, and is placed in parallel with the optical fiber jumper, and two ends of the first optical fiber are fixed onto the plugs at the two ends of the optical fiber jumper respectively. The first port sends the optical signal corresponding to the first port to the second port through the first optical fiber, and if the second port can receive the optical signal, the first port and the second port are in a connection status; the optical signal is an optical signal used for distinguishing the first port from other ports, and therefore, the port identification of the first port may be recognized according to a rule for generating the optical signal, that is, which port is currently connected to the second port may be known.

With the method for detecting a connection status of an optical fiber jumper provided in this embodiment of the present application, an optical fiber is disposed in parallel on an optical fiber jumper that is connected to any two ports, so that the optical fiber is connected to two ends of the optical fiber jumper respectively, an optical signal is generated at one of the ports and sent to the other port through the optical fiber, and an identification of the port sending the optical signal and a connection status of the two ports are detected through a case that the optical signal is received at the other port. Optical paths of different optical fiber jumpers are independent of each other, an interference signal between the optical paths does not occur in a detection procedure, and therefore, the detection procedure is made safer.

Figure 4:
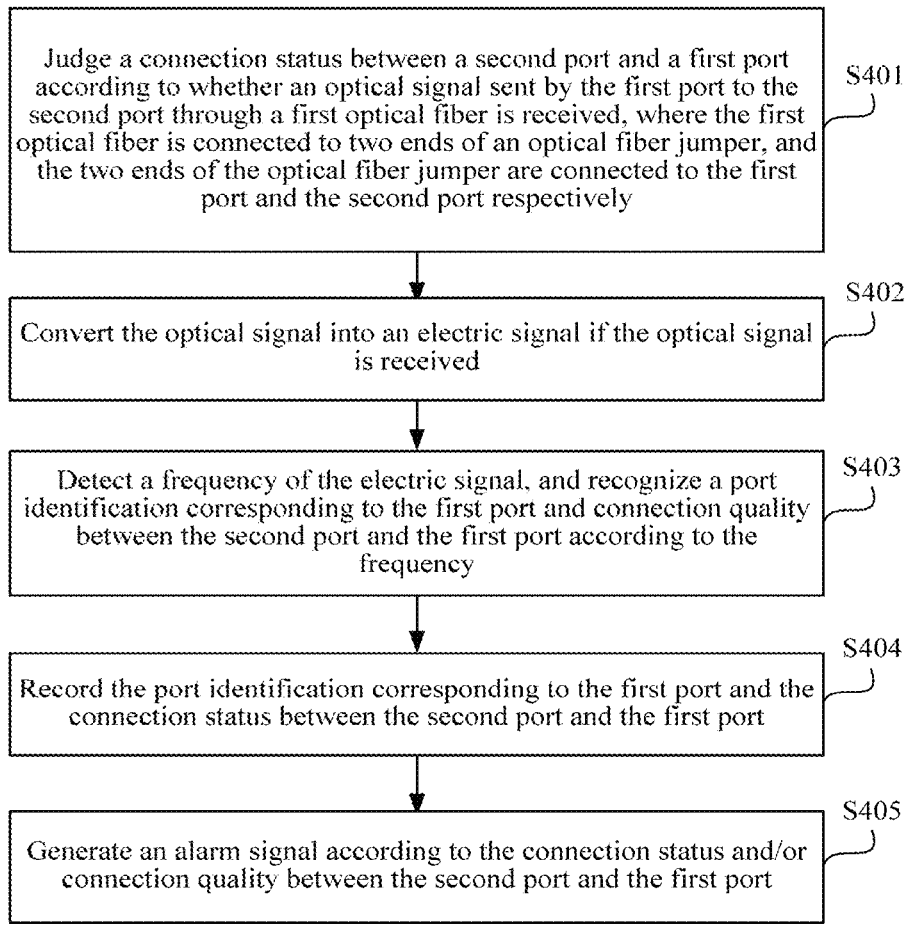
FIG. 4 is a flowchart of a method for detecting a connection status of an optical fiber jumper according to another embodiment of the present application.

FIG. 4 is a flowchart of a method for detecting a connection status of an optical fiber jumper according to another embodiment of the present application. As shown in FIG. 4, the method includes:

S401: Judge a connection status between a second port and a first port according to whether an optical signal sent by the first port to the second port through a first optical fiber is received, where the first optical fiber is connected to two ends of an optical fiber jumper, and the two ends of the optical fiber jumper are connected to the first port and the second port respectively.

S402: Convert the optical signal into an electric signal if the optical signal is received.

S403: Detect a frequency of the electric signal, and according to the frequency, recognize a port identification corresponding to the first port, and connection quality between the second port and the first port.

S404: Record the port identification corresponding to the first port, and a connection status between the second port and the first port.

S405: Generate an alarm signal according to the connection status and/or connection quality between the second port and the first port.

On the basis of the previous embodiment, an ID electric signal used for distinguishing the first port from other ports may be generated for the first port through a logic element. Then the ID electric signal is converted into an optical signal through some photoelectric converting elements, such as an LED. If the second port may receive the optical signal sent by the first port, it indicates that the second port and the first port are in a connection status; and if the second port cannot receive the optical signal sent by the first port, the second port and the first port are in a disconnected status. Furthermore, after receiving the optical signal sent by the first port through the first optical fiber, the second port firstly converts the received optical signal into an electric signal. Specifically, because the electric signal obtained after conversion is rather weak, the electric signal cannot be directly detected. Therefore, the weak electric signal may be converted into a corresponding pulse signal according to a pulse code modulation principle. Then the pulse signal is detected, and specifically, the detection may be divided into two steps: firstly judging whether a signal sent by an opposite end is 0 or 1. If the signal sent by the opposite end is 0, no pulse is output. If the signal sent by the opposite end is 1, the number of corresponding pulses is output. By comparing the number of the output pulses with a detection threshold, it may be determined that the opposite end outputs 1, and meanwhile, connection quality may be recognized according to the number of pulses, that is, if the number of pulses is large, the corresponding connection quality is better. Then the port number corresponding to the ID electric signal that is sent by the opposite end is detected. According to the number of and the location of 0 and 1 detected in a detection window, the port identification, that is, the port number, of a sending end is recognized, so that two connected ports may be determined. Moreover, the quality of connecting the optical fiber jumper to the first port and the second port is obtained according to the number of the detected pulses. Because a large number of optical fiber jumpers are connected in an ODF, and a record may not be kept in time after an operation of plugging an optical fiber jumper or replacing a connection port, each port may be detected in real time, thus monitoring changes of a port connected to each port in real time; after the detection, a record or update of a port identification corresponding to a port currently connected to the port may be recorded, and meanwhile, the connection status between the ports and the connection quality are recorded. If a case that a port connection is loose or disconnected occurs, alarm information may be sent out in time, so as to prompt managerial personnel to perform corresponding processing in time.

With the method for detecting a connection status of an optical fiber jumper provided in this embodiment of the present application, an optical fiber is disposed in parallel on an optical fiber jumper that is connected to any two ports, so that the optical fiber is connected to two ends of the optical fiber jumper respectively, an optical signal is generated at one of the ports and sent to the other port through the optical fiber, and an identification of the port sending the optical signal and a connection status of the two ports are detected through a case that the optical signal is received at the other port. Optical paths of different optical fiber jumpers are independent of each other, an interference signal between the optical paths does not occur in a detection procedure, and therefore, the detection procedure is made safer. Meanwhile, a connection status of each port can be updated in real time, and corresponding processing is conveniently performed for a wrong operation of the port.

Persons of ordinary skill in the art may understand that all or part of the steps of the preceding method embodiments may be accomplished by a program instructing relevant hardware. The preceding program may be stored in a computer readable storage medium. When the program is executed, the steps of the preceding method embodiments are performed. The preceding storage medium may include any medium that is capable of storing program codes, such as an ROM, an RAM, a magnetic disk, or an optical disk.

Figure 5:
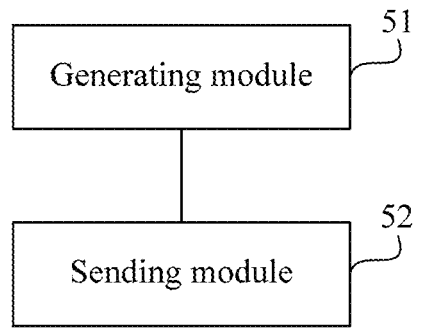
FIG. 5 is a schematic structural diagram of an apparatus for generating a signal indicating a connection status of an optical fiber jumper according to an embodiment of the present application.

FIG. 5 is a schematic structural diagram of an apparatus for generating a signal indicating a connection status of an optical fiber jumper according to an embodiment of the present application. As shown in FIG. 5, the apparatus includes: a generating module 51 and a sending module 52, where the generating module 51 is configured to generate an optical signal corresponding to a first port; and the sending module 52 is configured to send the optical signal to a second port through a first optical fiber, where the first optical fiber is connected to two ends of an optical fiber jumper, and the two ends of the optical fiber jumper are connected to the first port and the second port respectively.

Specifically, the first port and the second port are any two ports on an ODF of a machine room of an FTTX operator, the first port and the second port are connected through the optical fiber jumper having plugs at two ends thereof respectively; in order to test connection conditions between one of the plugs at the two ends of the optical fiber jumper and the first port, and between the other plug at the two ends of the optical fiber jumper and the second port, a first optical fiber for transferring a detecting signal may be added onto the optical fiber jumper, and the first optical fiber may be a POF, and definitely may also be other types of optical fibers having an aperture with a large numerical value. The length of the first optical fiber may be set according to the length of the optical fiber jumper, and is placed in parallel with the optical fiber jumper, and two ends of the first optical fiber are fixed onto the plugs at the two ends of the optical fiber jumper respectively. The apparatus and the first port are also connected through an optical fiber with the same material as that of the first optical fiber, such as a POF. It should be noted that, a cross section of the optical fiber between the apparatus and the first port needs to be aligned with a cross section of the first optical fiber, thus ensuring that the optical signal sent by the sending module 52 in the apparatus can smoothly enter the first optical fiber. In addition, in order to ensure that the optical signal sent by the sending module 52 can maximally enter the first optical fiber, and reduce the loss in the process of sending the optical signal, the cross section between the apparatus and the first port and the cross section of the first optical fiber need to be flat, and if the cross sections are not flat, the quality of the optical signal received by the second port is influenced, thus influencing the judgment on a connection status between the first port and the second port. Firstly, the generating module 51 generates the optical signal corresponding to the first port, the optical signal is sent to the second port by the sending module 52 through the first optical fiber, and if the signal may be received by the second port, the first port and the second port are in a connection status. If the second port does not receive the optical signal sent by the first port to the second port through the first optical fiber, it indicates that the first port and the second port are in a disconnected status. The optical signal corresponding to the first port may be generated according to a rule, that is, the optical signal used for distinguishing the first port from other ports may be generated for the first port, and if the second port receives the optical signal sent by the first port, according to the rule for generating the optical signal, which port is currently connected to the second port may be judged.

With the apparatus for generating a signal indicating a connection status of an optical fiber jumper provided in this embodiment of the present application, an optical fiber is disposed in parallel on an optical fiber jumper that is connected to any two ports, so that the optical fiber is connected to two ends of the optical fiber jumper respectively, an optical signal is generated at one of the ports and sent to the other port through the optical fiber, and an identification of the port sending the optical signal and a connection status of the two ports are detected through a case that the optical signal is received at the other port. Optical paths of different optical fiber jumpers are independent of each other, an interference signal between the optical paths does not occur in a detection procedure, and therefore, the detection procedure is made safer.

Figure 6:
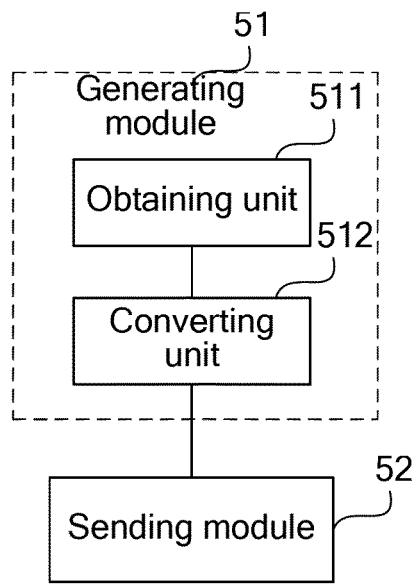
FIG. 6 is a schematic structural diagram of an apparatus for generating a signal indicating a connection status of an optical fiber jumper according to another embodiment of the present application.

FIG. 6 is a schematic structural diagram of an apparatus for generating a signal indicating a connection status of an optical fiber jumper according to another embodiment of the present application. As shown in FIG. 6, the apparatus includes: a generating module 51 and a sending module 52; and the generating module 51 may further include: an obtaining unit 511 and a converting unit 512; the obtaining unit 511 is configured to obtain an identification electric signal corresponding to a first port; and the converting unit 512 is configured to convert the identification electric signal into an optical signal.

On the basis of the previous embodiment, firstly an ID electric signal used for distinguishing each port from other ports may be generated for each port through the obtaining unit 511, and then the ID electric signal is converted into an optical signal through the converting unit 512. The obtaining unit 511 may be a logic element, and the converting unit 512 may be a photoelectric converting element, such as an LED. A wavelength of the optical signal may be selected according to an optical characteristic of a first optical fiber and the converting unit 512. Taking that the first optical fiber is a POF and the converting unit 512 is an LED as an example, light whose wavelength is 650 nm may be selected as an optical signal, and a square wave output by an IO pin of the obtaining unit 511 is adopted to directly drive an LE D whose center wavelength is 650 nm; a frequency of the square wave is less than a cut-off frequency of the LED, and the frequency generally may be several thousand hertz. The sending module 52 sends the optical signal to a second port through the first optical fiber, and if the optical signal may be received by the second port, it may be regarded that the first port and the second port are in a connection status, and according to a rule for generating the optical signal, which port is currently connected to the second port may be detected. If the second port does not receive the optical signal sent by the first port to the second port through the first optical fiber, it indicates that the first port and the second port are in a disconnected status.

With the apparatus for generating a signal indicating a connection status of an optical fiber jumper provided in this embodiment of the present application, an optical fiber is disposed in parallel on an optical fiber jumper that is connected to any two ports, so that the optical fiber is connected to two ends of the optical fiber jumper respectively, an optical signal is generated at one of the ports and sent to the other port through the optical fiber, and an identification of the port sending the optical signal and a connection status of the two ports are detected through a case that the optical signal is received at the other port. Optical paths of different optical fiber jumpers are independent of each other, an interference signal between the optical paths does not occur in a detection procedure, and therefore, the detection procedure is made safer.

Figure 7:
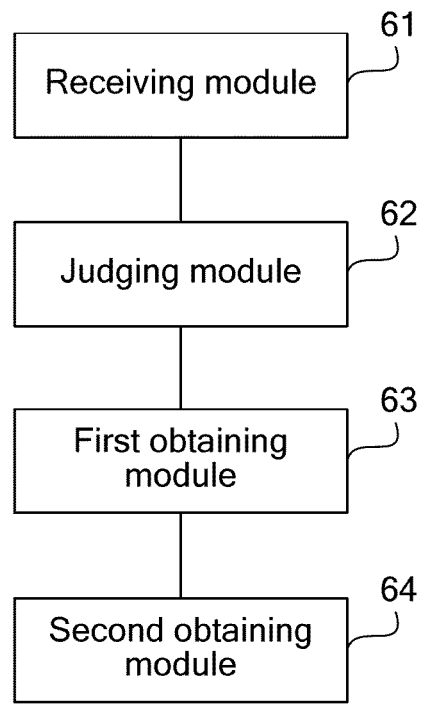
FIG. 7 is a schematic structural diagram of an apparatus for detecting a connection status of an optical fiber jumper according to an embodiment of the present application.

FIG. 7 is a schematic structural diagram of an apparatus for detecting a connection status of an optical fiber jumper according to another embodiment of the present application. As shown in FIG. 7, the apparatus includes: a receiving module 61, a judging module 62, a first obtaining module 63, and a second obtaining module 64, where the receiving module 61 is configured to receive an optical signal sent by a first port to a second port through a first optical fiber, where the first optical fiber is connected to two ends of the optical fiber jumper, and the two ends of the optical fiber jumper are respectively connected to the first port and the second port; the judging module 62 is configured to judge whether the receiving module 61 receives the optical signal; the first obtaining module 63 is configured to obtain a connection status between the second port and the first port according to a judgment result of the judging module 62; and the second obtaining module 64 is configured to obtain a port identification corresponding to the first port according to the optical signal if the receiving module 61 receives the optical signal.

Specifically, the first port and the second port are any two ports connected onto an ODF of a machine room of an FTTX operator, the first port and the second port are connected through the optical fiber jumper having plugs at two ends thereof respectively; in order to test connection conditions between one of the plugs at the two ends of the optical fiber jumper and the first port, and between the other plug at the two ends of the optical fiber jumper and the second port, a first optical fiber for transferring a detecting signal may be added onto the optical fiber jumper, and the first optical fiber may be a POF, and definitely may also be other types of optical fibers having an aperture with a large numerical value. The length of the first optical fiber may be set according to the length of the optical fiber jumper, and is placed in parallel with the optical fiber jumper, and two ends of the first optical fiber are fixed onto the plugs at the two ends of the optical fiber jumper respectively. The apparatus and the second port are connected through an optical fiber with the same material as that of the first optical fiber, such as a POF. A cross section of the optical fiber between the apparatus and the second port needs to be aligned with a cross section of the first optical fiber, thus ensuring that the receiving module 61 in the apparatus can smoothly receive the optical signal through the first optical fiber. In addition, in order to reduce the loss in the process of receiving the optical signal, the cross section between the apparatus and the second port and the cross section of the first optical fiber need to be flat, and if the cross sections are not flat, the quality of the optical signal received by the second port is influenced, thus influencing the judgment on a connection status between the first port and the second port. The first port sends the optical signal corresponding to the first port to the second port through the first optical fiber, and if the judging module 62 judges that the receiving module 61 receives the optical signal, the first obtaining module 63 may obtain that the first port and the second port are in a connection status; if the judging module 62 judges that the receiving module 61 cannot receive the optical signal, the first obtaining module 63 may obtain that the first port and the second port are in a disconnected status. In addition, if the receiving module 61 can receive the optical signal, and because the optical signal is an optical signal used for distinguishing the first port from other ports, the second obtaining module 64 may recognize the port identification, that is, the port number of the first port according to a rule for generating the optical signal, thus knowing which port is currently connected to the second port.

With the apparatus for detecting a connection status of an optical fiber jumper provided in this embodiment of the present application, an optical fiber is disposed in parallel on an optical fiber jumper that is connected to any two ports, so that the optical fiber is connected to two ends of the optical fiber jumper respectively, an optical signal is generated at one of the ports and sent to the other port through the optical fiber, and an identification of the port sending the optical signal and a connection status of the two ports are detected through a case that the optical signal is received at the other port. Optical paths of different optical fiber jumpers are independent of each other, an interference signal between the optical paths does not occur in a detection procedure, and therefore, the detection procedure is made safer.

Figure 8:
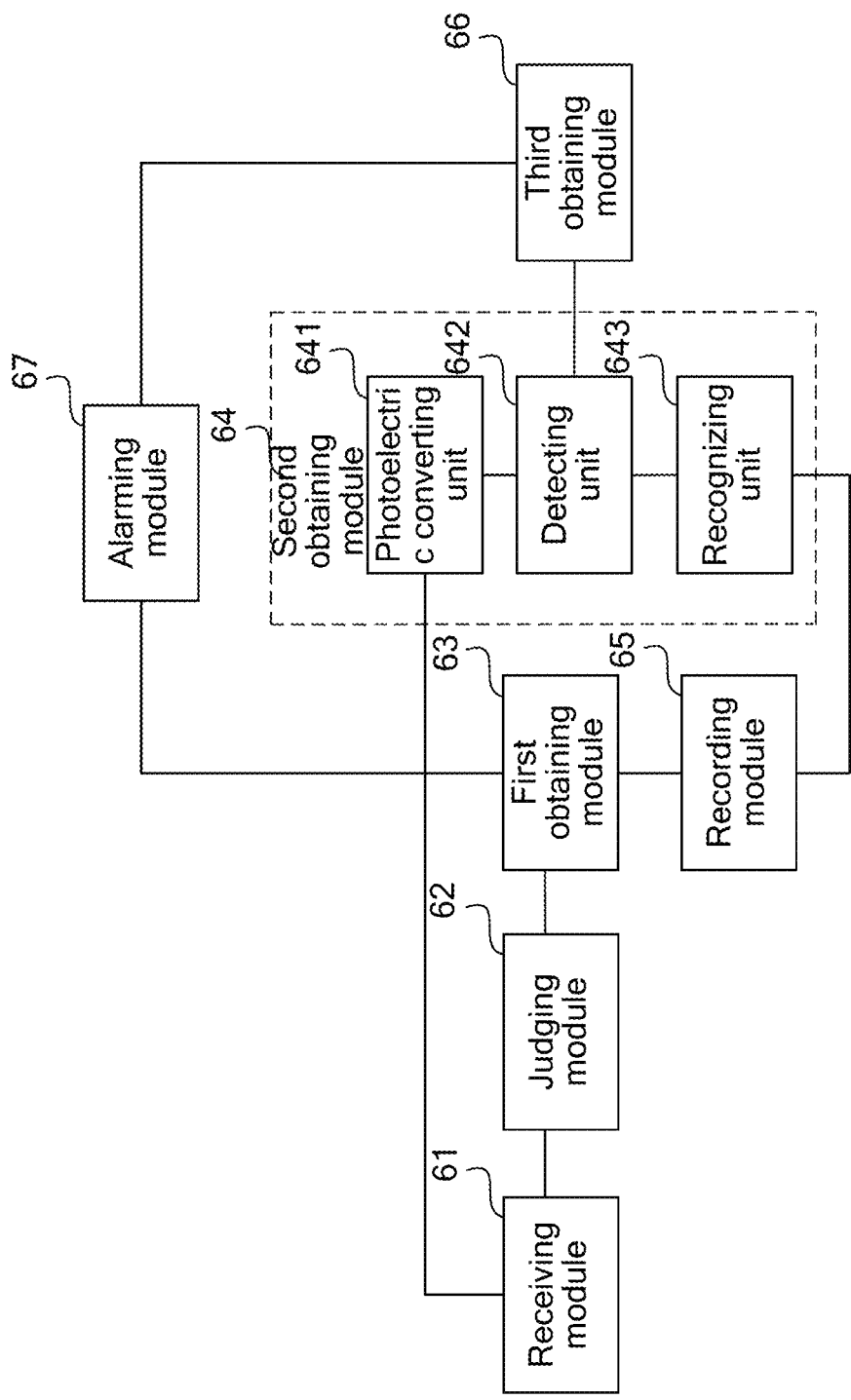
FIG. 8 is a schematic structural diagram of an apparatus for detecting a connection status of an optical fiber jumper according to another embodiment of the present application.

FIG. 8 is a schematic structural diagram of an apparatus for detecting a connection status of an optical fiber jumper according to another embodiment of the present application. As shown in FIG. 8, the apparatus includes: a receiving module 61, a judging module 62, a first obtaining module 63, and a second obtaining module 64; furthermore, the apparatus may further include: a recording module 65, a third obtaining module 66 and an alarming module 67; the recording module 65 is configured to record a port identification of a first port obtained by the first obtaining module 63; if the receiving module 61 receives an optical signal, the port identification corresponding to the first port obtained by the second obtaining module 64 is recorded; the second obtaining module 64 may include a photoelectric converting unit 641, a detecting unit 642 and a recognizing unit 643; the photoelectric converting unit 641 is configured to convert the optical signal into an electric signal; the detecting unit 642 is configured to detect a frequency of the electric signal; the recognizing unit 643 is configured to recognize the port identification corresponding to the first port according to the frequency; the third obtaining module 66 is configured to recognize connection quality between a second port and the first port according to the frequency detected by the detecting unit 642; and the alarming module 67 is configured to generate an alarm signal according to a connection status between the second port and the first port obtained by the first obtaining module 63 and/or the connection quality between the second port and the first port obtained by the third obtaining module 66.

On the basis of the previous embodiment, an ID electric signal used for distinguishing the first port from other ports may be generated for the first port through a logic element. Then the ID electric signal is converted into an optical signal through some photoelectric converting elements, such as an LED. If the judging module 62 judges that the receiving module 61 receives the optical signal, the first obtaining module 63 may obtain that the second port and the first port are in a connection status; and if the judging module 62 judges that the receiving module 61 cannot receive the optical signal sent by the first port, the first obtaining module 63 may obtain that the second port and the first port are in a disconnected status. Furthermore, after the receiving module 61 receives the optical signal sent by the first port through a first optical fiber, firstly the received optical signal is converted into an electric signal through the photoelectric converting unit 641, and then a port identification corresponding to the port sending the optical signal and the connection quality between the second port and the first port are detected through the detecting unit 642, and are recognized through the recognizing unit 643. Light whose wavelength is 650 nm may be selected as an optical signal according to an optical characteristic of a POF and an optical characteristic of a PD. After the optical signal received by the receiving module 61 is converted by the photoelectric converting unit 641, the voltage of the optical signal is only about 200 millivolts. For detection of a weak electric signal, generally, signal amplification may be firstly performed on the electric signal, and then the electric signal is converted by adopting an analog-to-digital converting element. However, the cost of this detection solution is high.

Figure 9:
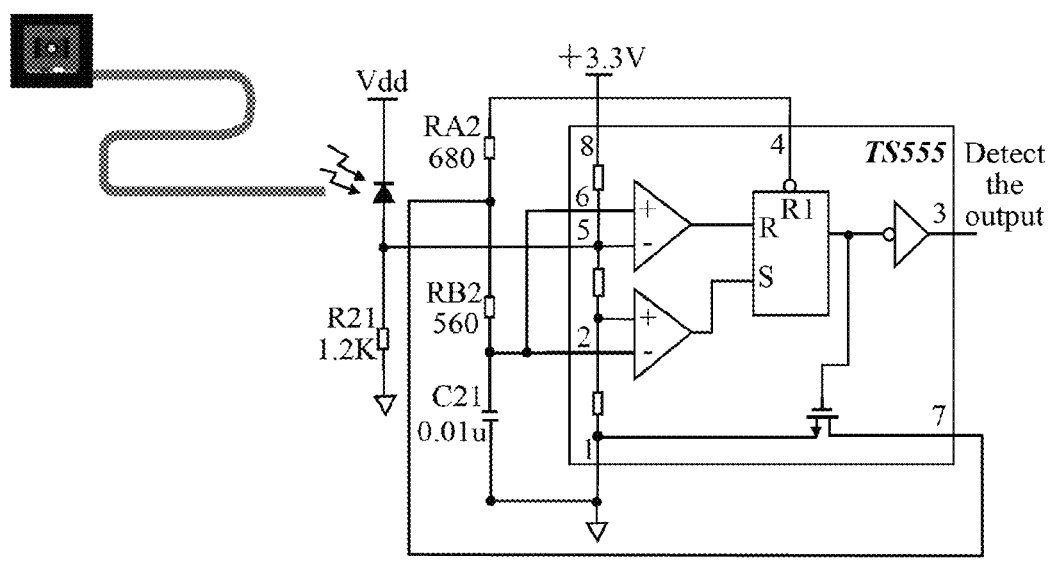
FIG. 9 is a circuit diagram for detecting a connection status of an optical fiber jumper by adopting TS555 according to an embodiment of the present application.

Another feasible method is that, the weak electric signal is converted into changes of the number of pulses by adopting a pulse code modulation principle, so as to achieve an objective of detecting the weak electric signal by detecting the number of pulses. The detecting unit 642 may adopt some integrated chips, such as a TS555 chip. FIG. 9 is a circuit diagram for detecting a connection status of an optical fiber jumper by adopting TS555 according to an embodiment of the present application. Moreover, connection quality between an optical fiber jumper and a first port or a second port is judged through the number of pulses of an electric signal. A large number of optical fiber jumpers are connected in an ODF, and a record may not be kept in time after an operation of plugging an optical fiber jumper or replacing a connection port, and therefore, each port may be detected in real time, thus monitoring changes of a port connected to each port in real time; after the detection, a record or update of a port identification corresponding to a port currently connected to the port may be recorded through the recording module 65, and meanwhile, a connection status and connection condition between the ports are recorded. If a case that a port connection is loose or disconnected, alarm information may be sent out in time, so as to prompt managerial personnel to perform corresponding processing in time.

With the apparatus for detecting a connection status of an optical fiber jumper provided in this embodiment of the present application, an optical fiber is disposed in parallel on an optical fiber jumper that is connected to any two ports, so that the optical fiber is connected to two ends of the optical fiber jumper respectively, an optical signal is generated at one of the ports and sent to the other port through the optical fiber, and an identification of the port sending the optical signal and a connection status of the two ports are detected through a case that the optical signal is received at the other port. Optical paths of different optical fiber jumpers are independent of each other, an interference signal between the optical paths does not occur in a detection procedure, and therefore, the detection procedure is made safer. Meanwhile, a connection status of each port can be updated in real time, and corresponding processing is conveniently performed for a wrong operation of the port.

Figure 10:
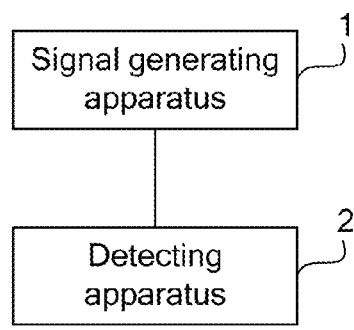
FIG. 10 is a schematic structural diagram of a system for detecting a connection status of an optical fiber jumper according to an embodiment of the present application.

FIG. 10 is a schematic structural diagram of a system for detecting a connection status of an optical fiber jumper according to an embodiment of the present application. As shown in FIG. 10, the system includes: a signal generating apparatus 1 and a detecting apparatus 2, where the signal generating apparatus 1 is configured to generate an optical signal corresponding to a first port, and send the optical signal to a second port through a first optical fiber, where the first optical fiber is connected to two ends of an optical fiber jumper, and the two ends of the optical fiber jumper are respectively connected to the first port and the second port; and the detecting apparatus 2 is configured to judge a connection status between the second port and the first port according to whether the optical signal sent by the first port to the second port through the first optical fiber is received, and obtain a port identification corresponding to the first port according to the optical signal if the optical signal is received.

In order to detect each port of an ODF and a local area network end in real time, and monitor a connection condition between each port and other ports in real time, the system may be connected to each port, and the system and each port may be connected by adopting the first optical fiber, and the first optical fiber may be a POF, and may also be other types of optical fibers having an aperture with a large numerical value. In this way, any two ports connected between the ODF and the local area network end are respectively connected to the system for detecting a connection status of an optical fiber jumper, any two ports connected between the ODF and the local area network end are respectively the first port and the second port, and the first port and the second port are respectively connected to the signal generating apparatus 1 and the detecting apparatus 2. If a connection status between the first port and the second port needs to be detected, firstly the optical signal corresponding to the first port is generated by adopting the signal generating apparatus 1, and the signal is sent to the second port through the optical fiber jumper; if the detecting apparatus 2 connected to the second port receives the optical signal, through the optical signal, the detecting apparatus 2 may further recognize a port identification, that is, the port number of the first port connected to the second port, and know which port is currently in a connection status with the second port; and if the detecting apparatus 2 cannot receive the optical signal, the first port and the second port are in a disconnected status. In the same way, for any port, which port is in a connection status with the port may be detected through the received optical signal.

With the method, the apparatus and the system for detecting a connection status of an optical fiber jumper provided in the embodiments of the present application, an optical fiber is disposed in parallel on an optical fiber jumper that is connected to any two ports, so that the optical fiber is connected to two ends of the optical fiber jumper respectively, an optical signal is generated at one of the ports and sent to the other port through the optical fiber, and an identification of the port sending the optical signal and a connection status of the two ports are detected through a case that the optical signal is received at the other port. Optical paths of different optical fiber jumpers are independent of each other, an interference signal between the optical paths does not occur in a detection procedure, and therefore, the detection procedure is made safer.

The embodiments described above are merely exemplary. Many modifications to these embodiments may be made without departing from the spirit and scope of the claims.

What is claimed is:

1. A method for detecting a connection status of an optical fiber jumper, comprising:
    determining a connection status of a first port and a second port according to whether an optical signal sent by the first port is received by the second port through an optical fiber, wherein the optical fiber is disposed in parallel to the optical fiber jumper, and the optical fiber jumper is terminated having both ends terminated with respective first and second plugs,
    wherein the first port and the second port are any two ports connected onto an Optical Distribution Frame (ODF) of a machine room of an FTTX operator, wherein a first end of the optical fiber is connected to the same first plug of the optical fiber jumper, and a second end of the optical fiber is connected to the same second plug of the optical fiber jumper, wherein the first plug is connected to the first port and the second plug is connected to the second port, respectively; and
    if the optical signal sent by the first port is received by the second port, obtaining a port identification corresponding to the first port according to the optical signal.

2. The method according to claim 1, further comprising:
    recording the connection status between the first port and the second port; and
    recording the port identification corresponding to the first port if the optical signal is received.

3. The method according to claim 1, wherein the obtaining the port identification corresponding to the first port according to the optical signal comprises:
    converting the optical signal into an electric signal;
    detecting a frequency of the electric signal; and
    determining the port identification corresponding to the first port according to the frequency.

4. The method according to claim 3, further comprising:
    determining a connection quality between the first port and the second port according to the frequency.

5. The method according to claim 4, further comprising:
    generating an alarm signal according to the connection status between the first port and the second port or the connection quality between the first port and the second port.

6. The method according to claim 1, further comprising:
    generating an optical signal corresponding to the first port; and
    sending the optical signal to the second port through the first optical fiber.

7. The method according to claim 6, wherein the generating an optical signal corresponding to the first port comprises:
    generating an identification electric signal of the first port; and
    converting the identification electric signal into the optical signal.

8. An apparatus for detecting a connection status of an optical fiber jumper, comprising:
    a receiving module configured to receive an optical signal sent by a first port to a second port through an optical fiber, wherein the optical fiber is disposed in parallel to the optical fiber jumper, and the optical fiber jumper having both ends terminated with respective first and second plugs on both ends, wherein the first port and the second port are any two ports connected onto an Optical Distribution Frame (ODF) of a machine room of an FTTX operator, wherein a first end of the optical fiber is connected to the same first plug and a second end of the optical fiber is connected to the same second plug of the optical fiber jumper, wherein the first plug is connected to the first port and the second plug is connected to the second port, respectively;
    a determination module configured to determine whether the receiving module receives the optical signal sent by the first port;
    a first obtaining module configured to obtain a connection status between the first port and the second port according to a determination result of the determination module; and
    a second obtaining module configured to obtain a port identification corresponding to the first port according to the optical signal if the receiving module receives the optical signal.

9. The apparatus according to claim 8, further comprising:
    a recording module configured to record the connection status between the first port and the second port obtained by the first obtaining module; and record the port identification corresponding to the first port obtained by the second obtaining module if the receiving module receives the optical signal.

10. The apparatus according to claim 8, wherein the second obtaining module comprises:
    a photoelectric converting unit configured to convert the optical signal into an electric signal;
    a detecting unit configured to detect a frequency of the electric signal; and an identification unit configured to identify the port identification corresponding to the first port according to the frequency.

11. The apparatus according to claim 10, further comprising:
   a third obtaining module configured to determine a connection quality between the first port and the second port according to the frequency detected by the detecting unit.

12. The apparatus according to claim 11, further comprising:
   an alarm module configured to generate an alarm signal according to the connection status between the first port and the second port obtained by the first obtaining module or according to the connection quality between the first port and the second port obtained by the third obtaining module.

13. The apparatus according to claim 8, further comprises:
   a generating module configured to generate an optical signal corresponding to the first port; and
   a sending module configured to send the optical signal to the second port through the optical fiber.

14. The apparatus according to claim 13, wherein the generating module comprises:
   a generating unit configured to generate an identification electric signal of the first port; and
   a converting unit configured to convert the identification electric signal into the optical signal.

15. A system for detecting a connection status of an optical fiber jumper, comprising:
   a signal generating apparatus configured to generate an optical signal corresponding to a first port, and send the optical signal to a second port through an optical fiber, wherein the optical fiber is disposed in parallel to the optical fiber jumper, and the optical fiber jumper having both ends terminated with respective first and second plugs, wherein the first port and the second port are any two ports connected onto an Optical Distribution Frame (ODF) of a machine room of an FTTX operator, wherein a first end of the optical fiber is connected to the same first plug and a second end of the optical fiber is connected to the same second plug of the optical fiber jumper, wherein the first plug is connected to the first port and the second plug is connected to the second port, respectively; and
   a detecting apparatus configured to detect a connection status between the first port and the second port according to whether the optical signal sent by the first port to the second port through the optical fiber is received, and obtain a port identification corresponding to the first port according to the optical signal if the optical signal is received.

* * * * *